United States Patent
Nakano (10) Patent No.: US 8,295,255 B2
(45) Date of Patent: Oct. 23, 2012

(54) WIRELESS LAN SYSTEM, ACCESS POINT, AND METHOD FOR PREVENTING CONNECTION TO A ROGUE ACCESS POINT

(75) Inventor: Yoshihisa Nakano, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1195 days.

(21) Appl. No.: 11/798,855

(22) Filed: May 17, 2007

(65) Prior Publication Data

US 2008/0002651 A1    Jan. 3, 2008

(30) Foreign Application Priority Data

Jul. 3, 2006   (JP) .................................. 2006-183450

(51) Int. Cl.
*H04W 4/00* (2009.01)

(52) U.S. Cl. ........ 370/338; 370/328; 370/401; 455/410; 455/411; 726/2; 726/22; 726/23

(58) Field of Classification Search .................. 370/338, 370/352, 503, 350, 343, 318, 319; 455/428, 455/63.1, 114.2, 410; 726/2, 22, 23
See application file for complete search history.

(56) References Cited

U.S. PATENT DOCUMENTS

| 2006/0153153 A1* | 7/2006 | Bhagwat et al. | 370/338 |
| 2007/0058598 A1* | 3/2007 | Ling | 370/338 |
| 2007/0079376 A1* | 4/2007 | Robert et al. | 726/23 |
| 2007/0140163 A1* | 6/2007 | Meier et al. | 370/329 |

FOREIGN PATENT DOCUMENTS

| JP | 2000-312162 | 11/2000 |
| WO | WO 2005/057233 A2 | 6/2005 |

* cited by examiner

*Primary Examiner* — Anthony Addy
*Assistant Examiner* — Khalid Shaheed
(74) *Attorney, Agent, or Firm* — Rabin & Berdo, P.C.

(57) ABSTRACT

A wireless local area network system includes one or more access points connected to a wired network which is part of the system. To prevent wireless terminals from communicating with a rogue access point that is not connected to the wired network, a legitimate access point detects the rogue access point, determines its beacon signal period, and sets a timer to generate timings at which the rogue access point is expected to transmit the beacon signals. At each of these timings, the legitimate access point creates and transmits interfering data that interfere with the rogue access point's beacon signals.

12 Claims, 7 Drawing Sheets

WIRELESS LAN SYSTEM, ACCESS POINT, AND METHOD FOR PREVENTING CONNECTION TO A ROGUE ACCESS POINT

BACKGROUND OF THE INVENTION

1. Field of the Invention

The present invention relates to a wireless local area network (LAN), more particularly to a method, access point, and system for detecting rogue access points and preventing wireless terminals from connecting with them.

2. Description of the Related Art

Figure 1:
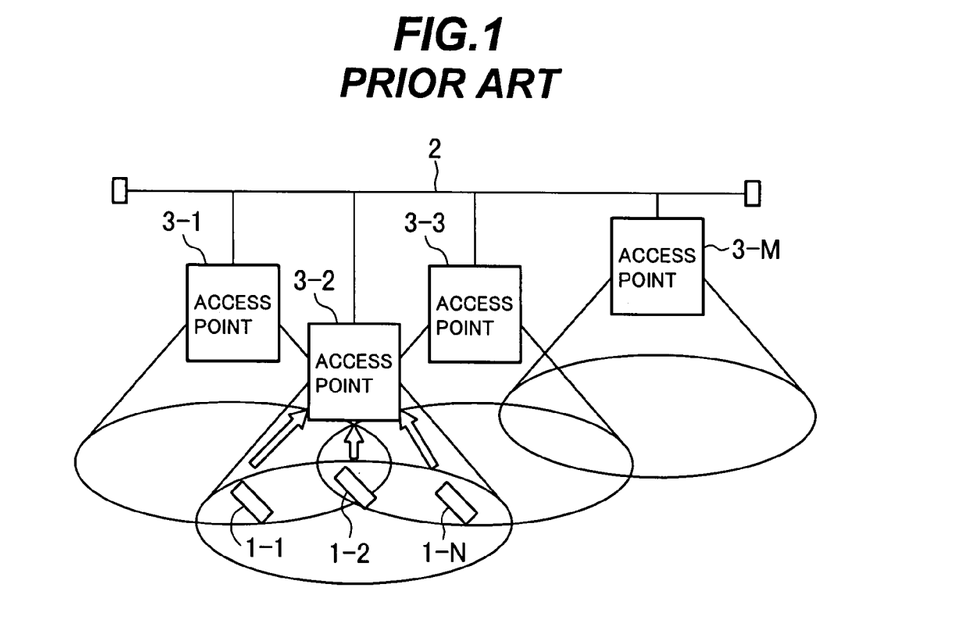
FIG. 1 is a block diagram showing the basic structure of a corporate wireless LAN system.

A typical corporate wireless LAN system has the structure shown in FIG. 1, in which wireless LAN terminals 1-1 to 1-N access a wired LAN 2 through access points 3-1 to 3-M, where M and N are positive integers. Japanese Patent Application Publication No. 2000-312162, for example, describes wireless LAN systems of this type.

The wireless LAN terminals 1-n (where n is from 1 to N) and the access points 3-m (where m is from 1 to M) are wirelessly connected without the need of transmission cables, so the terminals have greater mobility than in a wired network. Wireless LAN systems are therefore becoming a popular type of corporate network infrastructure.

Figure 2:
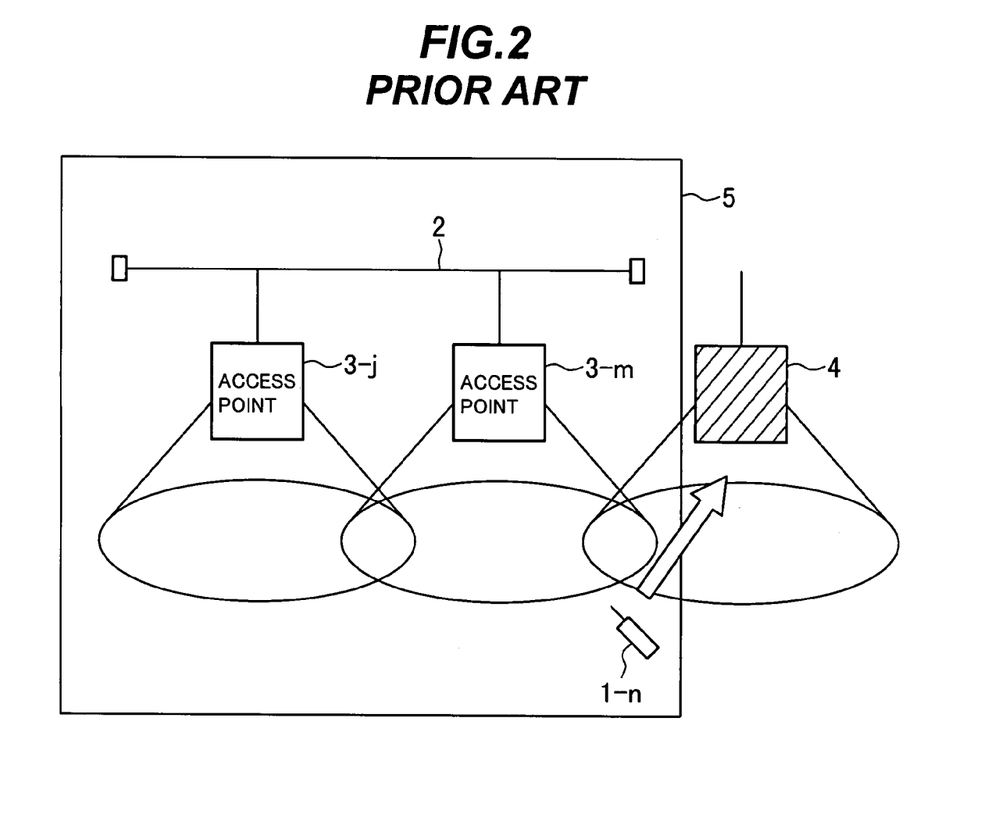
FIG. 2 is a diagram illustrating the problem addressed by the present invention.

However, wireless signals pass through the walls of corporate buildings in which wireless LANs are located, so if a rogue access point 4 is set up outside a building 5 by a third party as in FIG. 2 with the intention of eavesdropping, it is difficult for a wireless LAN terminal 1-n to tell whether this access point is legitimate or not.

To address this problem, the present applicant has proposed a method by which a legitimate access point can detect rogue access points around it (Japanese Patent Application No. 2006-060094). As wireless LAN systems are not connected by cables, however, it is difficult for a wireless LAN terminal to determine which access point it has connected to, and wireless LAN systems do not provide means by which an access point can notify a wireless LAN terminal that an access point is not legitimate, so even when a legitimate access point 3-m detects a rogue access point 4 nearby, that does not prevent a wireless LAN terminal 1-n from inadvertently connecting with the rogue access point 4, as illustrated in FIG. 2.

There is thus a great need for a method, system, and access point that can detect rogue access points and prevent wireless terminals from connecting with them.

SUMMARY OF THE INVENTION

An object of the present invention is to provide a simple and effective way to block connections with rogue access points.

The invention provides a rogue-resistant access point for mediating communication between a wireless LAN terminal and a wired LAN to which the rogue-resistant access point is connected, including a rogue access point detector for detecting a rogue access point and determining a period at which the rogue access point transmits beacon signals. The rogue access point is not connected to the wired LAN but is able to communicate with the wireless LAN terminal. An interference timing control unit in the rogue-resistant access point generates timings at which the rogue access point is expected to transmit the beacon signals. An interfering data transmitter in the rogue-resistant access point creates interfering data and wirelessly transmits the interfering data at said timings.

The rogue-resistant access point may further comprise a wireless data communication processor for recognizing adjacent access points from identifiers broadcast by the adjacent access points, wherein the rogue access point detector detects the rogue access point by transmitting rogue scanning data from the rogue-resistant access point on a route including at least part of the wired LAN and a wireless channel used by at least one of the adjacent access points, the route causing the rogue scanning data to return to the rogue-resistant access point, and recognizing any of the adjacent access points to which the rogue scanning data are transmitted but from which the transmitted rogue scanning data are not received as a rogue access point.

The rogue-resistant access point may further comprise a memory for storing the identifiers of the adjacent access points, wherein the wireless data communication processor stores information in the memory to indicate that an adjacent access point from which the transmitted rogue scanning data are received is a rogue-resistant access point, and the rogue access point detector, after transmitting the rogue scanning data, checks the memory and identifies any adjacent access point identified by one of the stored identifiers but not indicated to be a legitimate adjacent access point as a rogue access point.

The invention also provides a method of preventing connections to a rogue access point in a wireless LAN system, the wireless LAN system including a wired LAN to which the rogue access point is not connected, at least one legitimate access point connected to the wired LAN, and at least one wireless terminal operable to communicate with the access legitimate point and the rogue access point, the method being used by the legitimate access point, the method comprising:

detecting the rogue access point;

determining a period at which the rogue access point transmits beacon signals;

setting the period in a timer so that the timer generates timings at which the rogue access point is expected to transmit the beacon signals; and creating interfering data and wirelessly transmitting the interfering data at said timings.

The interfering data may be transmitted at a transmitting power normally used for transmitting communication data, or at a higher transmitting power.

The interfering data may be transmitted for a duration longer than an expected duration of the rogue access point's beacon signal.

Detecting the rogue access point may further comprise:

monitoring a wireless area around the legitimate access point to detect identifiers identifying adjacent access points;

storing the detected identifiers in a memory;

transmitting rogue scanning data from the legitimate access point on a route including at least part of the wired LAN and a wireless channel used by at least one of the adjacent access points identified by the identifiers stored in the memory, the route causing the rogue scanning data to return to the legitimate access point;

storing information in the memory to indicate that the adjacent access points through which the rogue scanning data return to the legitimate access point are legitimate adjacent access points; and recognizing an adjacent access point identified by one of the identifiers in the memory but not indicated to be a legitimate adjacent access point as the rogue access point.

The route may include a wired broadcast, multicast, or unicast from the legitimate access point on the wired LAN and a wireless broadcast or unicast by the at least one of the adjacent access points. If a unicast is used on the wired LAN, the legitimate access point may transmit different rogue scanning data to different adjacent access points.

Alternatively, the route may include a wireless transmission from the legitimate access point and a wired transmission by the at least one of the adjacent access points on the wired LAN, the wireless transmission being addressed to the legitimate access point.

The invention also provides a wireless LAN system using the above a rogue-resistant access point and method.

DETAILED DESCRIPTION OF THE INVENTION

An embodiment of the invention will now be described with reference to the attached drawings, in which like elements are indicated by like reference characters.

The embodiment encompasses a wireless LAN system of the type shown in FIGS. 1 and 2, at least some of its legitimate access points, and the method used by these access points to preventing connection to a rogue access point.

An access point in the wireless LAN system has a wireless communication unit for communicating with wireless LAN terminals in its own coverage area, a wired communication unit for communicating with the wired LAN (the wired backbone of the local area network), and a signal processing unit that passes signals between the wireless communication unit and wired communication unit and executes connection control processes.

Figure 3:
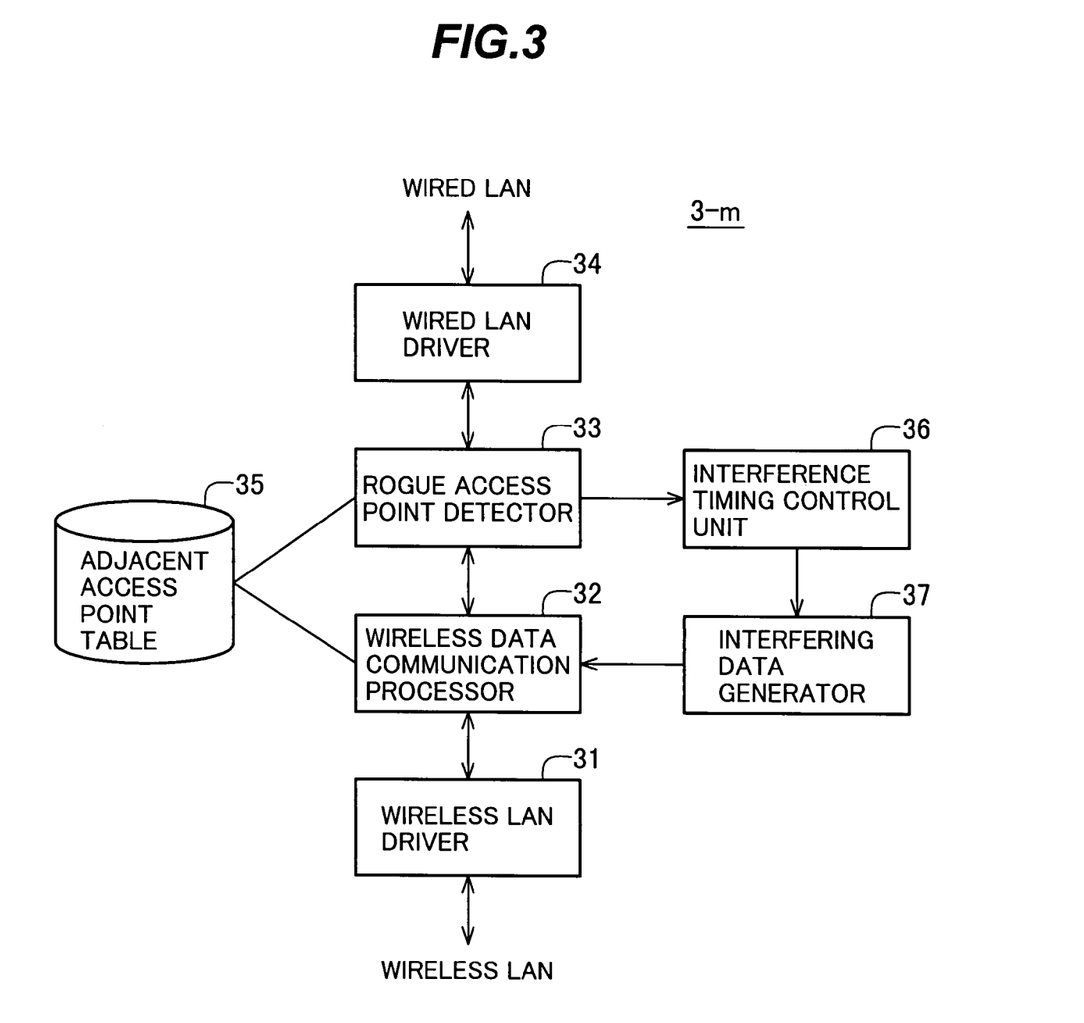
FIG. 3 is a functional block diagram showing the software structure of a rogue-resistant access point according to an embodiment of the invention.

The wireless communication unit, wired communication unit, and signal processing unit are hardware units, but the signal processing unit operates primarily by executing software on a central processing unit (CPU). In this embodiment, access point 3-m is a rogue-resistant access point including the signal processing software shown in FIG. 3. FIG. 3 shows part of the software structure involved in detecting a rogue access point and preventing the rogue access point from connecting to wireless LAN terminals; components relating to other functions such as the processing of control signals are omitted.

The relevant software structure in access point 3-m comprises a wireless LAN driver 31, a wireless data communication processor 32, a rogue access point detector 33, a wired LAN driver 34, an adjacent access point table 35, an interference timing control unit 36, and an interfering data generator 37.

The wireless LAN driver 31 controls the wireless LAN protocol and executes wireless data transmission tasks. Although access point 3-m uses the wireless LAN driver 31 to communicate with wireless LAN terminals, data transmitted by adjacent access points 3-j (where j is an integer from 1 to M, excluding m) may also reach access point 3-m and be received by the wireless LAN driver 31.

When so directed by the wireless data communication processor 32, the wireless LAN driver 31 wirelessly transmits rogue scanning data (a control signal including rogue scanning data) and interference data (a control signal including interference data) to its coverage area as described later. Access point 3-m uses multiple wireless channels in order to accommodate multiple wireless LAN terminals, and transmits the rogue scanning data through a channel not in use for communicating with the wireless LAN terminals.

The wireless data communication processor 32 receives and analyzes data received by the wireless LAN driver 31.

When a beacon signal is received from an adjacent access point 3-$j$, the wireless data communication processor 32 stores information about the adjacent access point in the adjacent access point table 35. The information stored about the adjacent access point 3-j includes an identifier identifying the adjacent access point (a Basic Service Set Identifier or BSSID, for example) and, for a rogue access point, its beacon period.

A beacon signal is a wireless LAN control frame that each access point transmits periodically. The beacon signal includes the BSSID, beacon period, and various information (concerning security, transmission speed, etc.) needed for connecting with the access point. The beacon signal notifies wireless LAN terminals of the existence of an access point in their vicinity; by receiving the beacon signal, the wireless LAN terminals obtain information about the access point, and may use this information to communicate (connect) with the access point.

When the wireless data communication processor 32 receives scanning data from an adjacent access point 3-j, it stores information in the adjacent access point table 35 to indicate that the adjacent access point 3-j is legitimate.

The wireless data communication processor 32 transmits scanning data received from the wired LAN 2 and interfering data created by the interfering data generator 37. Both types of data are transmitted wirelessly through the wireless LAN driver 31.

The rogue access point detector 33 periodically transmits scanning data to the wired LAN 2 to scan for a rogue access point 4. A predetermined time after transmitting scanning data, the rogue access point detector 33 checks the status information in the adjacent access point table 35 to determine whether there is a rogue access point 4.

When a rogue access point 4 is detected, the rogue access point detector 33 transmits data indicating the presence of the rogue access point 4, including an identifier such as a BSSID, to a host device (not shown) connected to the wired LAN 2, and sends the interference timing control unit 36 an identifier identifying the rogue access point 4 and its beacon period, including the timing at which it transmitted the last beacon signal.

When the rogue access point detector 33 receives rogue scanning data from the wired LAN 2, it sends the data to the wireless data communication processor 32 to be wirelessly transmitted by the wireless LAN driver 31.

The wired LAN driver 34 controls the wired LAN protocol and transmits data to and from the wired LAN 2.

The adjacent access point table 35 is a data file in a memory device, used for storing information about adjacent access points 3-j (identifiers identifying the access points, flags indicating whether they are legitimate access points, and beacon periods). Data are written into the adjacent access point table 35 by the wireless data communication processor 32 as described above. The status information in the adjacent access point table 35 is referred to by the rogue access point detector 33.

The interference timing control unit 36 commands the interfering data generator 37 to create interfering data according to the beacon period of a rogue access point 4 read from the adjacent access point table 35.

The interfering data generator 37 creates interfering data on command from the interference timing control unit 36 and sends the data to the wireless data communication processor 32 for wireless transmission.

The operation of the wireless LAN system in the embodiment will now be described, starting with the detection of a rogue access point and continuing with the prevention of connections between the rogue access point and wireless LAN terminals.

Each access point monitors the wireless LAN signals around it, including the beacon signals that the access points are required to transmit periodically. An access point generally receives beacon signals from one or more adjacent access points. In the present example, beacon signals transmitted from access point 3-j and rogue access point 4 as shown in FIG. 4 also reach access point 3-m.

A beacon signal includes the BSSID of the transmitting access point; the wireless data communication processor 32 of access point 3-m stores the BSSIDs in received beacon signals in the adjacent access point table 35 as identifiers identifying adjacent access points. In the example shown in FIG. 4, identifiers identifying legitimate access point 3-j and rogue access point 4 are stored in the adjacent access point table 35 in access point 3-m.

Figure 5:
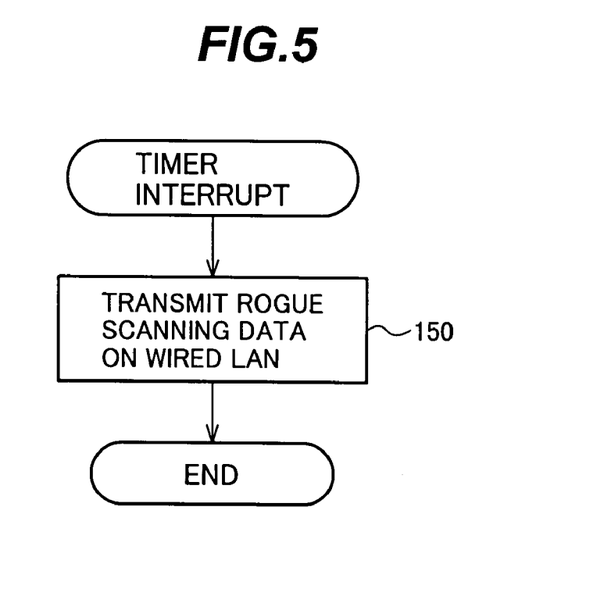
FIG. 5 is a flowchart illustrating the transmission of rogue scanning data by the rogue access point detector in the embodiment.

Each rogue-resistant access point starts the process illustrated in FIG. 5 in response to a periodic timer interrupt (at intervals of half an hour, for example). In this process, the rogue access point detector 33 in the access point broadcasts rogue scanning data on the wired LAN 2 (step 150). The rogue scanning data may be any type of broadcast data; there are no format restrictions.

Figure 4:
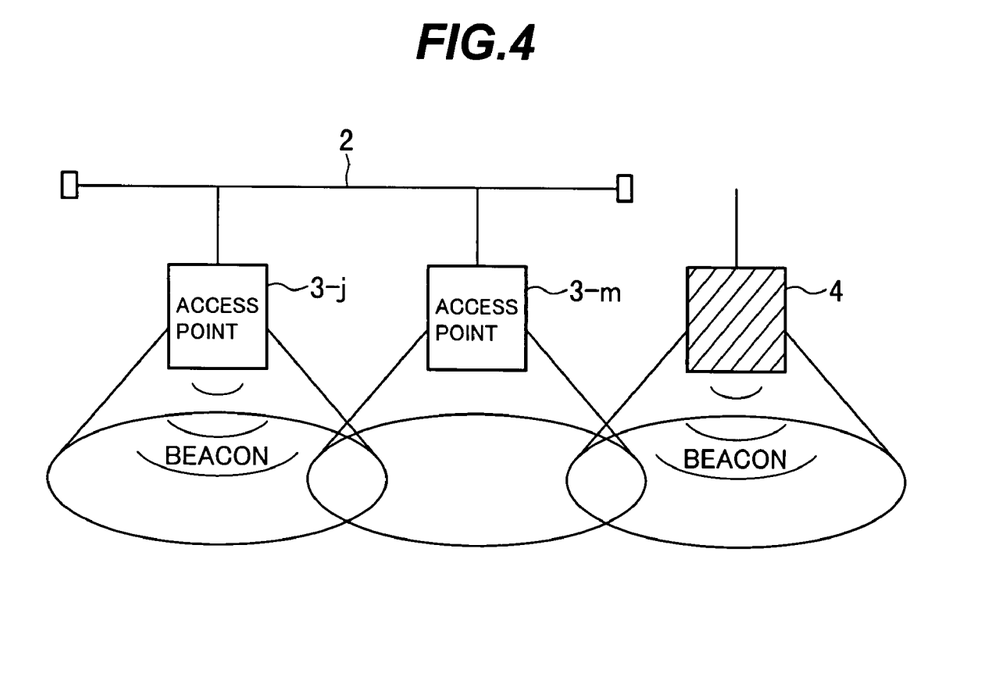
FIG. 4 is a diagram illustrating the transmission of beacon signals in the embodiment.

Since the rogue scanning data transmitted by access point 3-m in FIG. 4 are transmitted to the wired LAN 2, the data reach the adjacent legitimate access point 3-j but do not reach the rogue access point 4. Because the rogue scanning data are broadcast data, the legitimate access point 3-j treats the data as data to be relayed to the wireless side of the network, and transmits the rogue scanning data as a wireless broadcast on the LAN.

Figure 6:
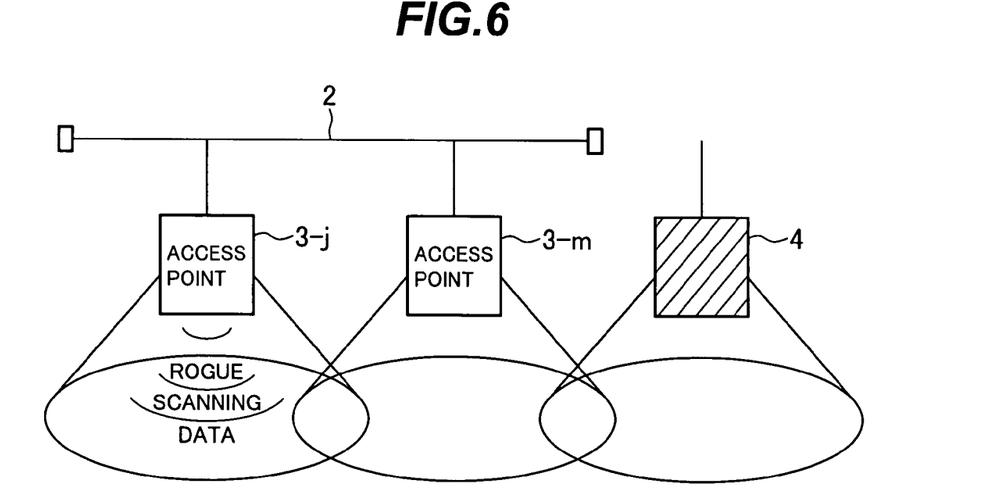
FIG. 6 is a diagram illustrating the;wireless transmission of rogue scanning data by an adjacent legitimate access point in the embodiment.

As shown in FIG. 6, the legitimate access point 3-j wirelessly transmits the rogue scanning data to its own coverage area, but no rogue scanning data are transmitted by the rogue access point 4. Since access point 3-m is able to receive the beacon signal of access point 3-j, it also receives the rogue scanning data transmitted by access point 3-j.

Figure 7:
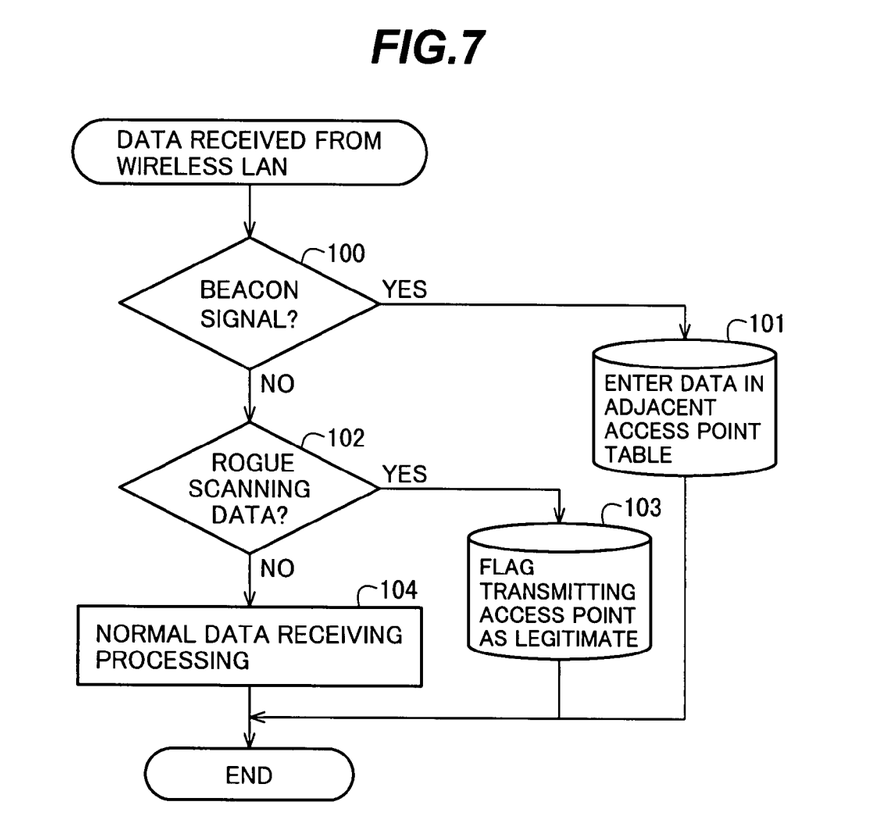
FIG. 7 is a flowchart illustrating the process performed by the wireless data communication processor in the embodiment when data are received.

FIG. 7 is a flowchart illustrating the process performed by the wireless data communication processor 32 in access point 3-m whenever data are received. When the received data constitute a beacon signal, the wireless data communication processor 32 stores the BSSID of the transmitting access point in the adjacent access point table 35 (steps 100 and 101) as described above. When the received data include rogue scanning data that the rogue access point detector 33 in the same access point 3-m has recently broadcast on the wired LAN 2, the wireless data communication processor 32 stores status information in the adjacent access point table 35 indicating that the access point 3-j from which the rogue scanning data are received is a legitimate access point (steps 102 and 103). Normally the BSSID of the access point 3-j will already be stored in an entry in the adjacent access point table 35, due to earlier reception of a beacon signal, so the wireless data communication processor 32 only has to add a status flag to this entry. If the received data are neither a beacon signal nor rogue scanning data, the wireless data communication processor 32 performs normal data receiving processing (step 104).

The wireless data communication processor 32 in access point 3-m should store information that indicates an access point to be legitimate only when it receives the rogue scanning data from the wireless LAN, with the BSSID of the access point, within a predetermined time (three minutes, for example) from the time when the data were broadcast on the wired LAN 2, and should refuse to accept rogue scanning data received after the predetermined time. The predetermined time should be short enough that even if the rogue access point 4 were to receive the scanning data in a wireless broadcast from another access point and promptly retransmit the scanning data in a wireless broadcast of its own, the data would not be accepted.

Since the rogue access point 4 transmits beacon signals but does not transmit rogue scanning data, or does not transmit rogue scanning data within the predetermined time, after the predetermined time, the adjacent access point table 35 in access point 3-m will include the BSSID of the rogue access point 4 but will not include status information indicating a legitimate access point.

Figure 8:
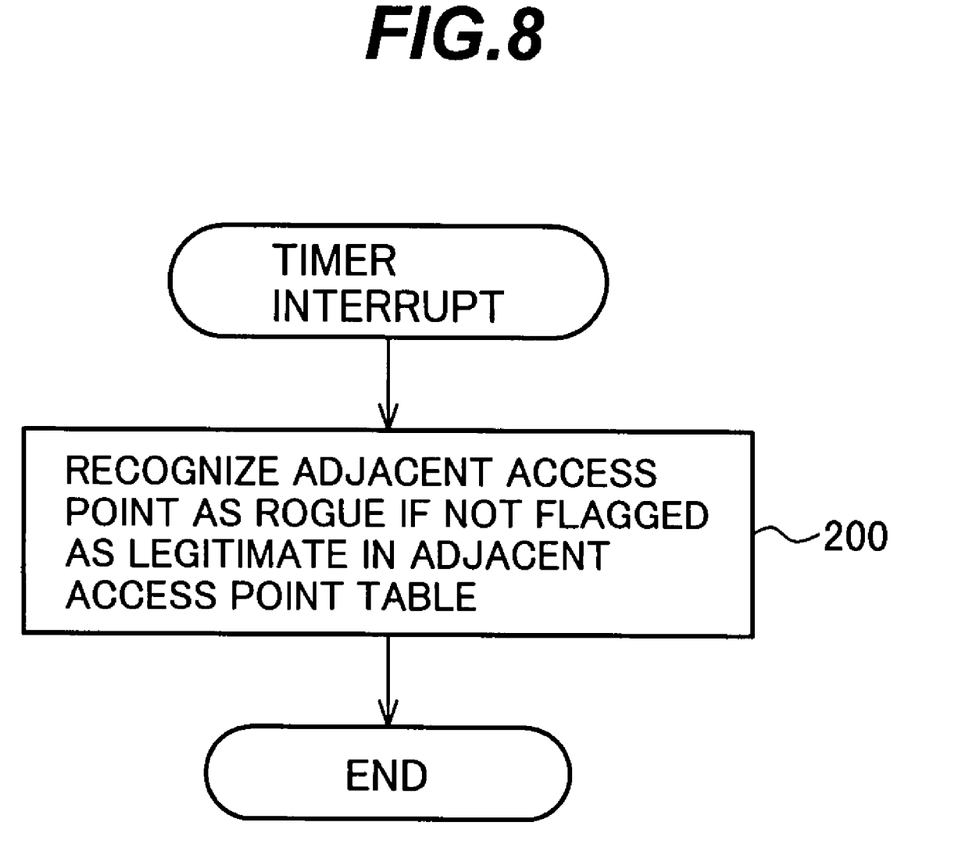
FIG. 8 is a flowchart illustrating the recognition of a rogue access point by the rogue access point detector in the embodiment.

The rogue access point detector 33 in the access point 3-m that originally transmitted the rogue scanning data starts the process illustrated in FIG. 8 in response to a timer interrupt after a predetermined interval (five minutes, for example) from the time of scanning data transmission. In this process, the rogue access point detector 33 checks to see if any BSSID stored in the adjacent access point table 35 lacks information indicating that it is a legitimate access point (step 200). Any BSSID lacking such information is recognized as the BSSID of a rogue access point. In the present example, the rogue access point 4 is detected in this way.

When a rogue access point 4 is detected, the rogue access point detector 33 notifies the host device, and the host device implements prescribed protection and alert measures (omitted in FIG. 8). For example, the host device may generate an audible alarm at the desk of the LAN system supervisor, or may cause a prerecorded audio message to be broadcast on a public address system in the building. The location of the access point 3-m that detected the rogue access point 4 may be included in the message to indicate the area in need of caution.

Figure 9:
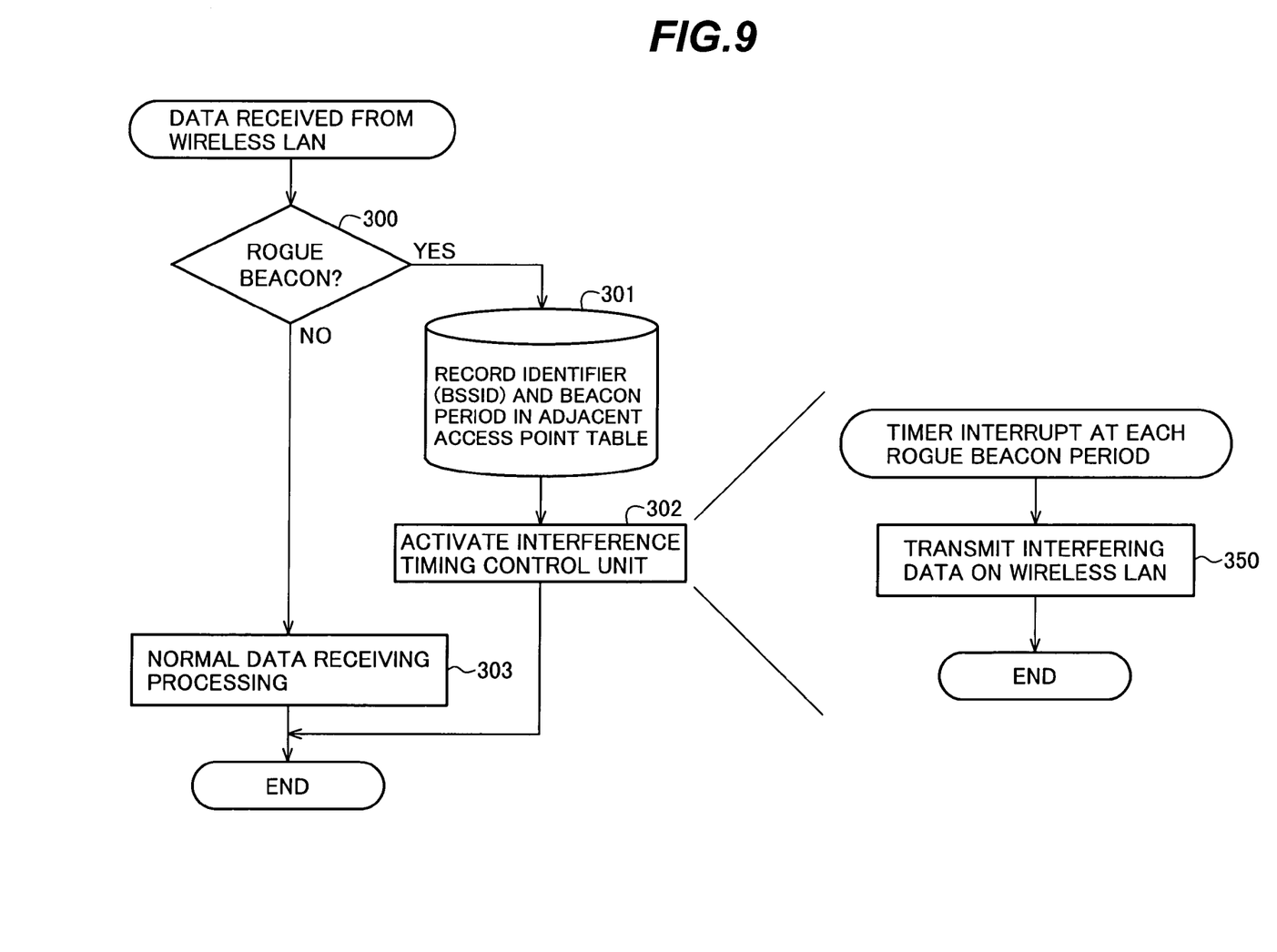
FIG. 9 is a flowchart illustrating the operations by which interfering data are transmitted in the embodiment.

When the rogue access point 4 is detected, as shown in FIG. 9, the rogue access point detector 33 in access point 3-m determines the beacon period (including the timing of the next transmission) from the beacon signal of the rogue access point 4, records this information in the adjacent access point table 35 (steps 300 and 301), and then activates the interference timing control unit 36 (step 302). Received data other than a beacon signal from a rogue access point are processed normally by the wireless data communication processor 32 (step 104).

The interference timing control unit 36 instructs the interfering data generator 37 to create interfering data (dummy data) and wirelessly transmit the interfering data at timings coinciding with the periodic beacon signal transmissions by the rogue access point 4 (step 350).

Figure 10:
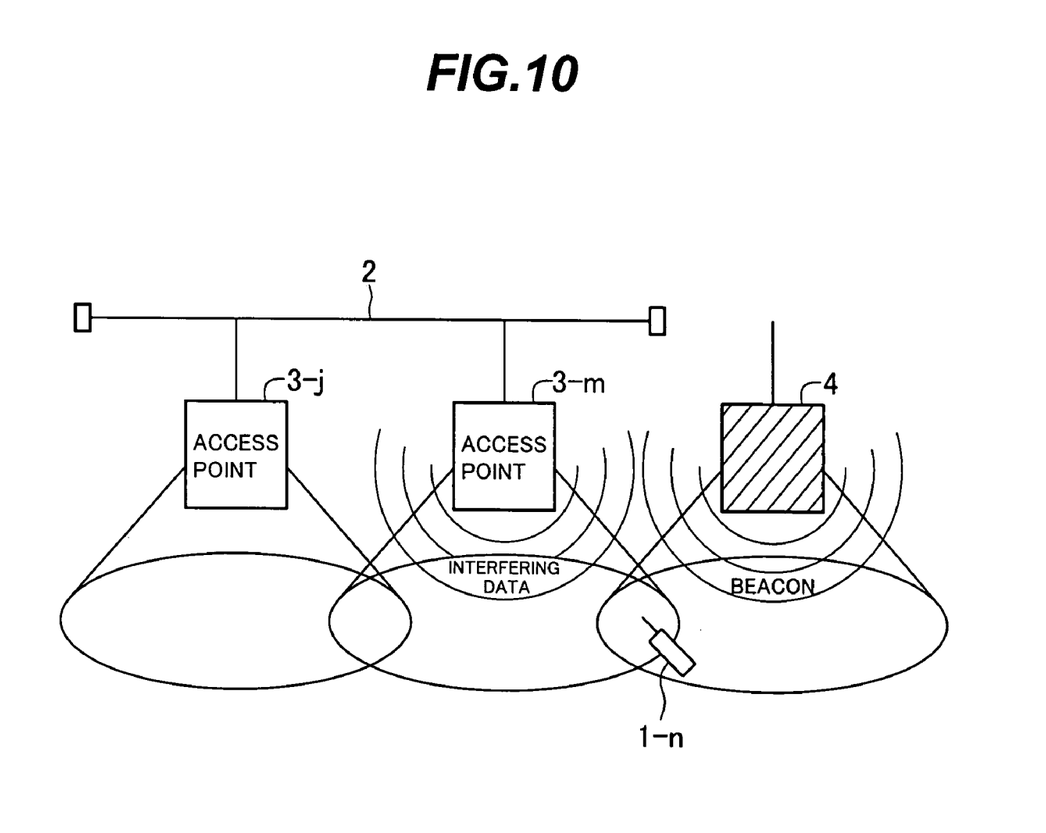
FIG. 10 is a diagram illustrating the collision of the interfering data with a beacon signal from a rogue access point in the embodiment.

Even when a wireless LAN terminal 1-n is within range of the beacon signal of the rogue access point 4 as shown in FIG. 10, the beacon signal from the rogue access point 4 and interference data transmitted by access point 3-m reach the wireless LAN terminal 1-n simultaneously, so the rogue access point's beacon signal is not received properly by the wireless LAN terminal 1-n. Consequently, the wireless LAN terminal 1-n does not connect to (communicate with) the rogue access point 4.

The interfering data (dummy data) may be any data that cause an error in the demodulation of the beacon signal of the rogue access point 4 received by the wireless LAN terminals.

In the embodiment described above, it is possible both to recognize a rogue access point and to prevent the rogue access point from connecting with wireless LAN terminals. When a rogue access point is detected, wireless LAN terminals are immediately prevented from connecting to it, so data leaks are promptly prevented.

In the above embodiment, access point 3-m broadcasts rogue scanning data to all access points connected to the wired LAN 2. In a variation of the embodiment, access point 3-m multicasts rogue scanning data to the adjacent access points identified by identifiers stored in the adjacent access point table 35, to avoid the needless wireless broadcasting of rogue scanning data by access points whose broadcasts would not be received by access point 3-m. In another variation, the access point 3-m transmits different rogue access point to each adjacent access point identified in the adjacent access point table 35 by a unicast, so that the rogue access point 4 will not be able to obtain the scanning data that that it must return to access point 3-m by eavesdropping on another access point's return broadcast. In these variations, the multicast or unicast route may include the host device, to assist the LAN system supervisor in supervising network security.

In yet another variation, instead of broadcasting the scanning data received from the wired LAN 2, the adjacent access points 3-j return the scanning data to access point 3-m by wireless unicasts addressed to access point 3-m treating access point 3-m as if it were a wireless terminal connected by a wireless link. Access point 3-m can use this method by emulating a wireless terminal connected to each of the adjacent access points 3-j, and by addressing the rogue scanning data to itself.

In still another variation, access point 3-m wirelessly broadcasts rogue scanning data addressed to itself, and legitimate adjacent access points that receive the wireless broadcast return the rogue scanning data via the wired LAN 2 to access point 3-m. The return route may include the host device. In this variation, even if the rogue access point 4 is able to obtain the scanning data broadcast by access point 3-m, it cannot send the scanning data back to access point 3-m over the wired LAN 2.

It is not necessary for all the legitimate access points in the wireless LAN to be rogue-resistant; the invention may be practiced by providing only some of the access points, such as access points installed near the outer walls of buildings, with rogue access point scanning functions.

In another variation of the above embodiment, the beacon period of each adjacent access point is determined and stored in the adjacent access point table 35 as soon as the existence of the adjacent access point is recognized from its beacon signal. Then if the access point is later found to be a rogue access point, the stored information can immediately be used to start interfering with its beacon signal.

After a rogue access point is detected, the wireless data communication processor 32 may monitor its beacon signal. If the rogue access point stops transmitting beacon signals, the transmission of interfering data may be halted.

The interfering data may be transmitted at the same transmitting power as used for communication transmissions, or at a higher transmission power to ensure effective interference. Also, to allow for timing error, the interfering data may be transmitted for a longer period of time than the expected duration of the rogue access point's beacon signal.

Those skilled in the art will recognize that further variations are possible within the scope of the invention, which is defined in the appended claims.

What is claimed is:

1. An access point detecting device connected to a wired LAN (Local Area Network) and communicating with a wireless LAN terminal, comprising:

an access point detector for monitoring the wireless space surrounding the access point detecting device, and obtaining identification information of a first access point device, and storing the identification information in an access point memory:

a scanning data transmitter for transmitting an access point scanning data: the access point scanning data being passed through the wired LAN, and then through a wireless channel connected to the first access point device identified by the identification information stored in the access point memory, and received by the access point detecting device, or through the wireless channel connected to the first access point device identified by the identification information stored in the access point memory, and then through the wired LAN, and received by the access point detecting device, information indicating that the first access point device on a route through which the access point scanning data has returned is a legitimate device being stored in the access point memory; and a wireless data communication processor for recognizing that the access point device for which the identification information is stored in the access point memory, but information indicating a legitimate device is not stored, as a rogue access point;

wherein the access point determines a period at which the rogue access point transmits beacon signal; setting the period in a timer so that the timer generates timings at which the rogue access point is expected to transmit the beacon signals; and wherein the access point creates interfering data and wirelessly transmits the interfering data at said timings, the interfering data transmitted at a transmitting power normally used for transmitting communication data, or at a higher power, and the interfering data is transmitted for a duration longer than the duration of the rogue access point's beacon signal.

2. The access point detecting device of claim 1, wherein the wireless data communication processor obtains information on the period of the beacon signal transmitted from the rogue access point, from the beacon signal transmitted from the recognized rogue access point device.

3. An access pint device including the access point detecting device of claim 2, and communicating with a wireless LAN terminal, and connected with a wired LAN, further comprising:

an interference timing control unit for generating timings at which the beacon signal is expected to be transmitted from the recognized rogue access point, on the basis of the information on the period of the beacon signal from the rogue access point; and an interfering data transmitter for transmitting the interfering data to the wireless space at the timings generated by the interfering timing control unit.

4. The access point device of claim 3, wherein the interfering data are transmitted at a transmitting power normally used for transmitting communication data.

5. The access point device of claim 3, wherein the interfering data are transmitted at a higher transmitting power than normally used for transmitting communication data.

6. The access point device of claim 3, wherein the interfering data are transmitted for a duration longer than an expected duration of the rogue access point's beacon signal.

7. A detecting method for an access point device connected to a wired LAN (Local Area Network) and communicating with a wireless LAN terminal, comprising the following steps:

an access point detecting step of monitoring the wireless space surrounding the access point device, and obtaining identification information of a first access point device, and storing the identification information in an access point memory;

a scanning data transmitting step of transmitting an access point scanning data; the access point scanning data being passed through the wired LAN, and then through a wireless channel connected to the first access point device identified by the identification information stored in the access point memory, and received by the access point detecting device, or through the wireless channel connected to the first access point device identified by the identification information stored in the access point memory, and then through the wired LAN, and received by the access point device;

information indicating that the first access point device on a route through which the access point scanning data has returned is a legitimate device being stored in the access point memory; and a wireless data communication processing step of recognizing the access point device for which the identification information is stored in the access point memory, but information indicating a legitimate device is not stored, as a rogue access point;

wherein the wireless data communication processing step obtains information on the period of the beacon signal transmitted from the rogue access point, from the beacon signal transmitted from the recognized rogue access point device;

an interference timing control step of generating timings at which the beacon signal is expected to be transmitted from the recognized rogue access point, on the basis of the information on the period of the beacon signal from the rogue access point; and an interfering data transmitting step of transmitting the interfering data to the wireless space at the timings generated by the interfering timing control step wherein further the interfering data may be transmitted at a transmitting power normally used for transmitting communication data, or at higher transmitting power; and the interfering data is transmitted for duration longer than the duration of the rogue access point's beacon signal.

8. The method of claim 7, wherein the wireless data communication processing step obtains information on the period of the beacon signal transmitted from the rogue access point, from the beacon signal transmitted from the recognized rogue access point device.

9. The method of claim 8, wherein the interfering data are transmitted at a transmitting power normally used for transmitting communication data.

10. The method of claim 8, wherein the interfering data are transmitted for a duration longer than an expected duration of the rogue access point's beacon signal.

11. A method of controlling an access point device connected a wired LAN and communicating with a wireless LAN terminal, including the method of detecting the access point device of claim 8, further comprising the following steps:

an interference timing control step of generating timings at which the beacon signal is expected to be transmitted from the recognized rogue access point, on the basis of the information on the period of the beacon signal from the rogue access point; and an interfering data transmitting step of transmitting the interfering data to the wireless space at the timings generated by the interfering timing control step.

12. The method of claim 11, wherein the interfering data are transmitted at a higher transmitting power than normally used for transmitting communication data.

* * * * *